United States Patent
Burt et al.

(10) Patent No.: US 11,345,330 B2
(45) Date of Patent: May 31, 2022

(54) METHODS AND SYSTEM OPERATING A VEHICLE DRIVELINE

(71) Applicant: Ford Global Technologies, LLC, Dearborn, MI (US)

(72) Inventors: Andrew Burt, Royal Oak, MI (US); Josh Dewalt, Canton, MI (US); Ka Wai Kevin So Zhao, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 299 days.

(21) Appl. No.: 16/102,211

(22) Filed: Aug. 13, 2018

(65) Prior Publication Data

US 2020/0047743 A1 Feb. 13, 2020

(51) Int. Cl.
| | |
|---|---|
| *B60W 20/16* | (2016.01) |
| *B60W 10/26* | (2006.01) |
| *B60K 6/448* | (2007.10) |
| *B60W 10/06* | (2006.01) |
| *B60W 10/08* | (2006.01) |
| *B60W 20/11* | (2016.01) |

(52) U.S. Cl.
CPC ............ *B60W 20/16* (2016.01); *B60W 10/26* (2013.01); *B60K 6/448* (2013.01); *B60L 2270/12* (2013.01); *B60W 10/06* (2013.01); *B60W 10/08* (2013.01); *B60W 20/11* (2016.01)

(58) Field of Classification Search
CPC ...... B60W 20/16; B60W 10/26; B60W 20/11; B60W 10/30; B60W 10/06; B60W 10/08; B60L 2270/01; B60L 2270/12; B60K 6/448

USPC .......................................................... 701/22
See application file for complete search history.

(56) References Cited

U.S. PATENT DOCUMENTS

| | | | |
|---|---|---|---|
| 6,879,895 B2 | 4/2005 | Capps et al. | |
| 9,156,466 B2 | 10/2015 | Huber et al. | |
| 2005/0209747 A1* | 9/2005 | Yakes ........................ | B60L 1/00 |
| | | | 701/22 |
| 2011/0295455 A1* | 12/2011 | Schenk ..................... | B60K 6/48 |
| | | | 701/22 |
| 2012/0029749 A1* | 2/2012 | Ulrey ..................... | B60W 10/30 |
| | | | 701/22 |
| 2015/0066292 A1* | 3/2015 | Macfarlane ........... | B60W 10/06 |
| | | | 701/36 |
| 2015/0191179 A1* | 7/2015 | Teraya .................. | B60H 1/2218 |
| | | | 701/22 |
| 2017/0159581 A1* | 6/2017 | McCarthy, Jr. .......... | F02D 13/06 |
| 2017/0274890 A1* | 9/2017 | Mansur ................... | B60L 55/00 |
| 2017/0361698 A1* | 12/2017 | Hussain .................... | F01P 1/06 |
| 2018/0162377 A1* | 6/2018 | Colavincenzo .......... | B60K 6/24 |

(Continued)

FOREIGN PATENT DOCUMENTS

DE 102012211196 * 6/2012 ................ B60L 1/00

*Primary Examiner* — Jess Whittington
*Assistant Examiner* — Terry C Buse
(74) *Attorney, Agent, or Firm* — David Kelley; McCoy Russell LLP

(57) ABSTRACT

Systems and methods for operating a vehicle driveline that includes an engine and an electric machine are described. In one example, an amount of electrical power that is available to electrical consumers that are electrically coupled to a high voltage bus is adjusted responsive to a temperature of a catalyst for the purpose of reducing engine emissions.

19 Claims, 12 Drawing Sheets

(56) References Cited

U.S. PATENT DOCUMENTS

2019/0161070 A1* 5/2019 Kamatani ............. B60W 20/16
2019/0366800 A1* 12/2019 Durrani .............. B60H 1/00021

* cited by examiner

METHODS AND SYSTEM OPERATING A VEHICLE DRIVELINE

FIELD

The present description relates to methods and a system for operating a driveline of a hybrid vehicle.

BACKGROUND AND SUMMARY

An engine may be included in a vehicle driveline that also includes an electrical machine. The engine may be started when the electrical machine lacks capacity to provide a desired driver demand power or during conditions when battery charge is low. If the engine and the engine's exhaust system are cold when the engine is started, engine emissions may be higher than is desired for a period of time. The engine may expel higher levels of hydrocarbons and carbon monoxide when the engine is cold due to hydrocarbons that may exit the engine without having participated in combustion. For example, hydrocarbons may become lodged between pistons and cylinder walls during compression and power strokes, but these hydrocarbons may be ejected from the engine's cylinders during exhaust strokes. The concentration of hydrocarbons ejected from an engine may be a function of many factors including engine load and engine temperature. If the engine's exhaust system is cold, higher concentrations of hydrocarbons and carbon monoxide may flow to atmosphere. Therefore, it may be desirable to provide a way of reducing engine emissions when an engine is cold started.

The inventors herein have recognized the above-mentioned issues and have developed a vehicle driveline operating method, comprising: via a controller, decreasing an amount of power supplied to high voltage accessories coupled to a high voltage bus responsive to a desired engine power amount plus an electric energy storage device discharge power upper threshold amount minus an amount of power supplied to the high voltage accessories coupled to high voltage bus being greater than a driver demand power.

By decreasing an amount of power supplied to high voltage accessories that are coupled to a high voltage bus, it may be possible to provide the technical result of reducing engine loads after an engine start so that engine emissions may be reduced. In particular, an amount of power that is supplied to high voltage accessories may be reduced so that additional power may flow to an electric machine that provides propulsive force to the vehicle. Since power output of the electric machine may be increased, power output from the engine may be decreased while meeting driver demand power. Consequently, the engine may be operated at a lower load to reduce engine emissions until the engine is warm or until an even higher driver demand power is requested.

The present description may provide several advantages. For example, the approach may reduce engine emissions after engine starting. Further, the approach may reduce catalyst light-off times when a driver is requesting higher power demands. Further still, the approach may reduce a number of occasions when an engine is started to meet driver demand power.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
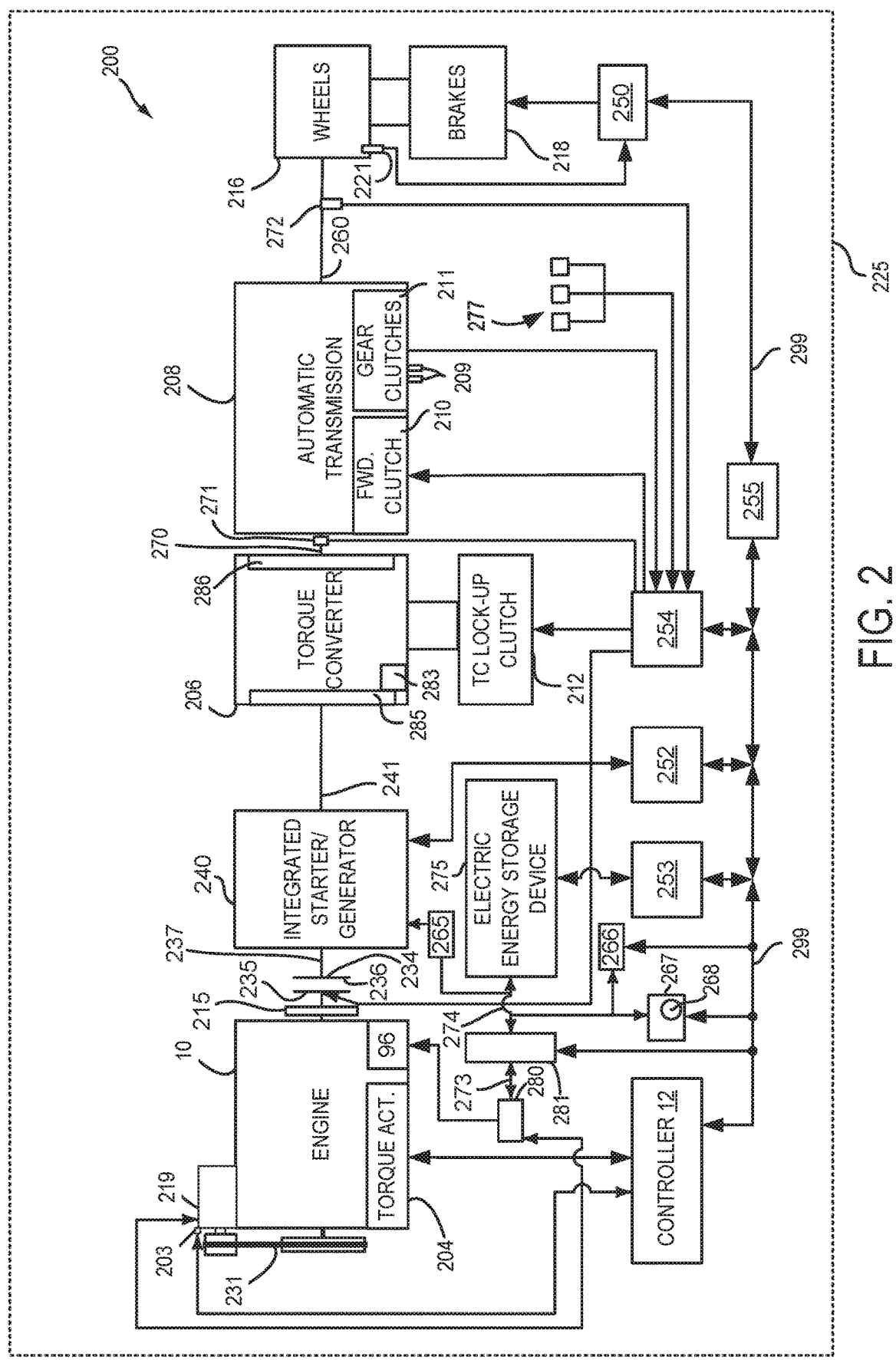
FIG. 2 is a schematic diagram of a hybrid vehicle driveline.
Figure 3:
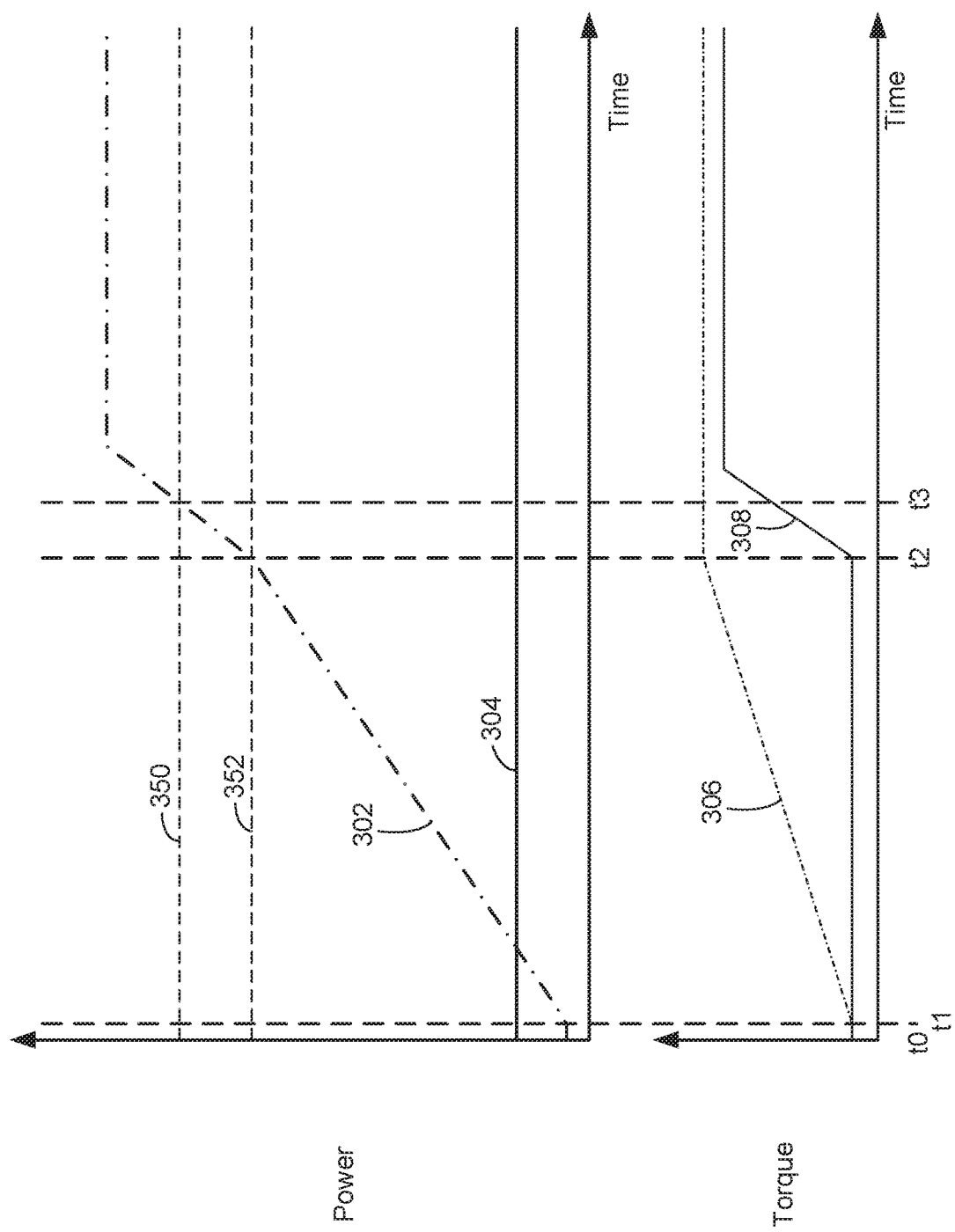
FIG. 3 show an example of a prior art electric machine control sequence.
Figure 4:
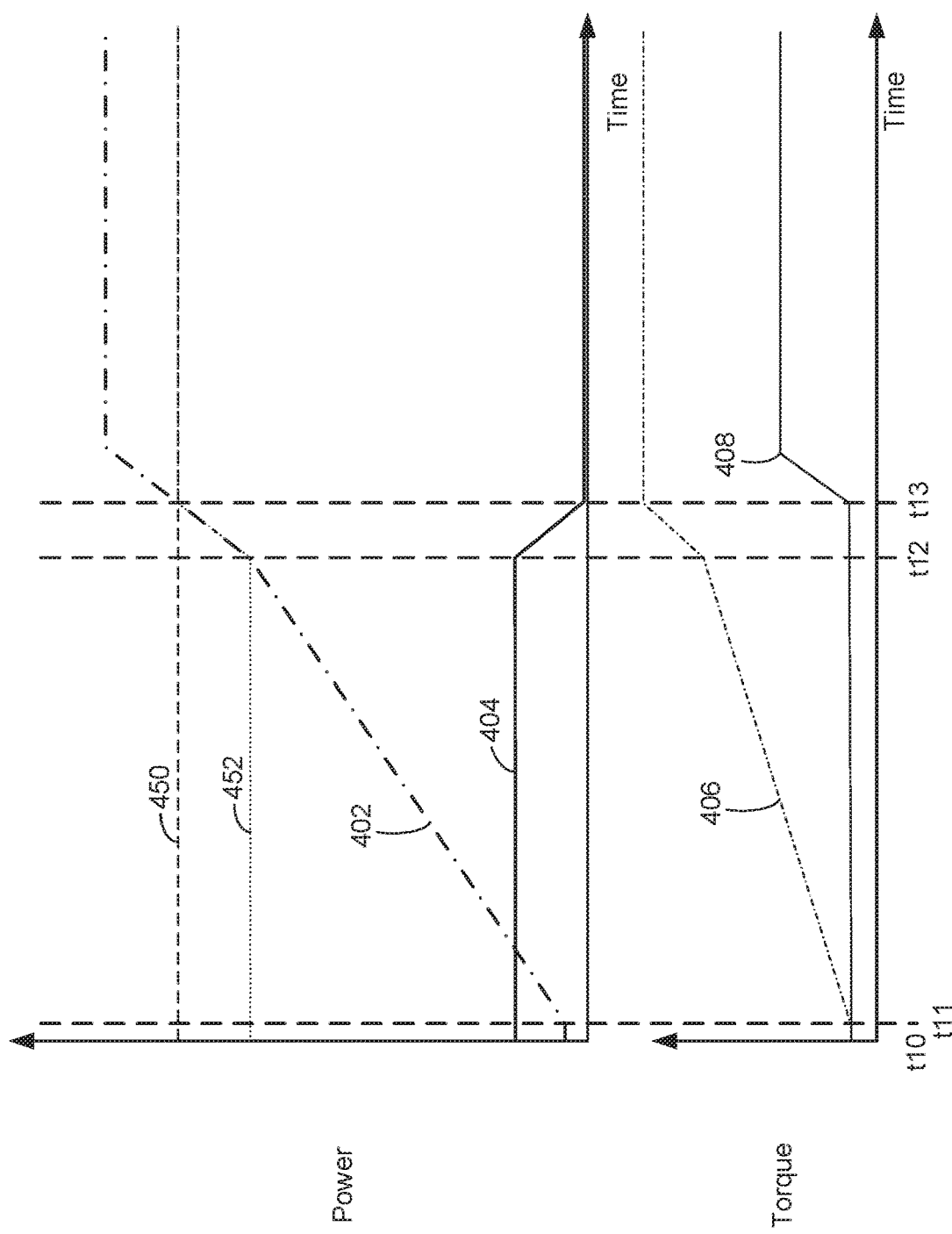
FIG. 4 shows an example electric machine control sequence according to the method of FIGS. 10A and 10B.
Figure 5:
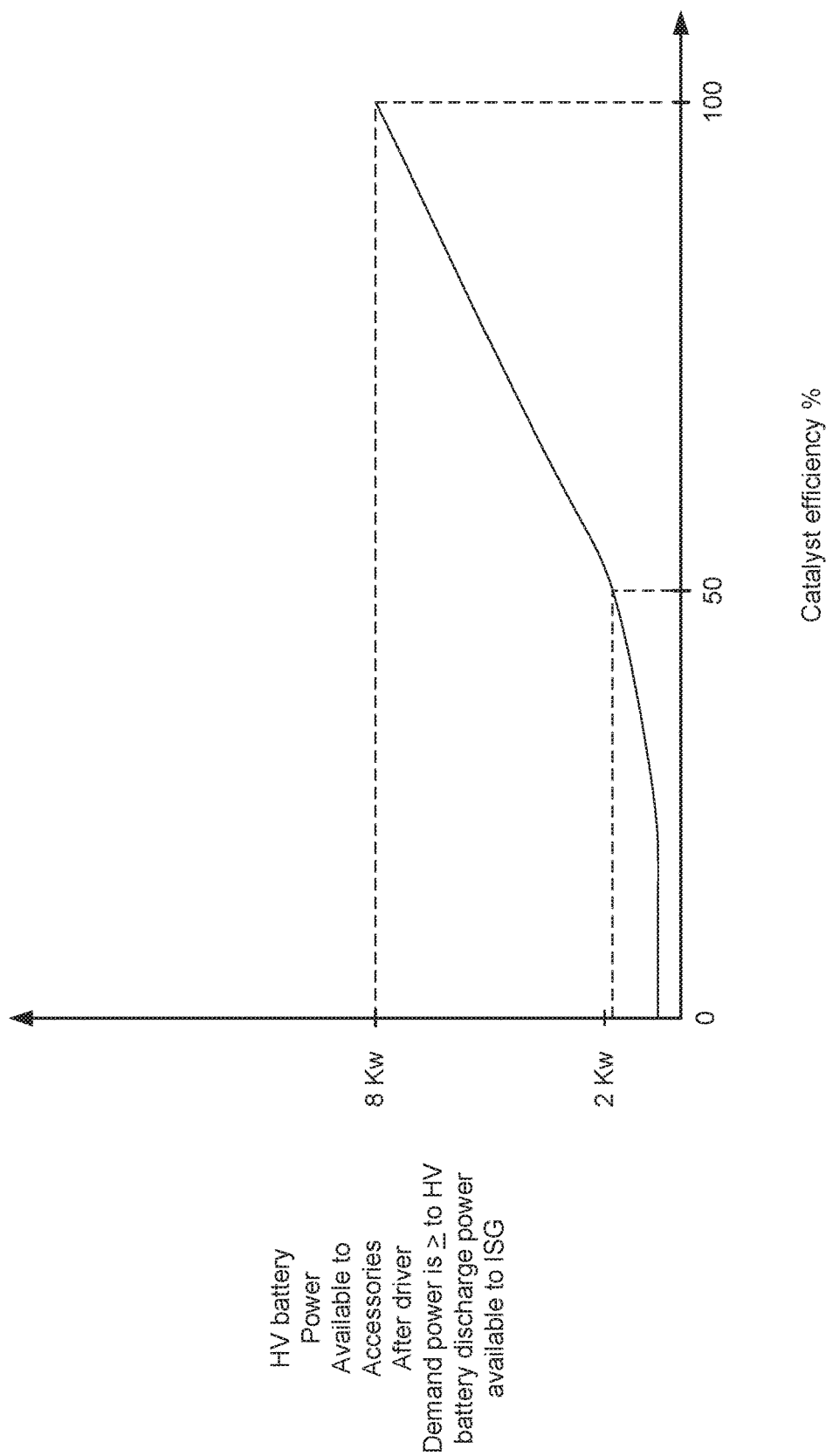
FIG. 5 shows an example function for adjusting an amount of power that is available for high voltage accessories based on catalyst efficiency.
Figure 6:
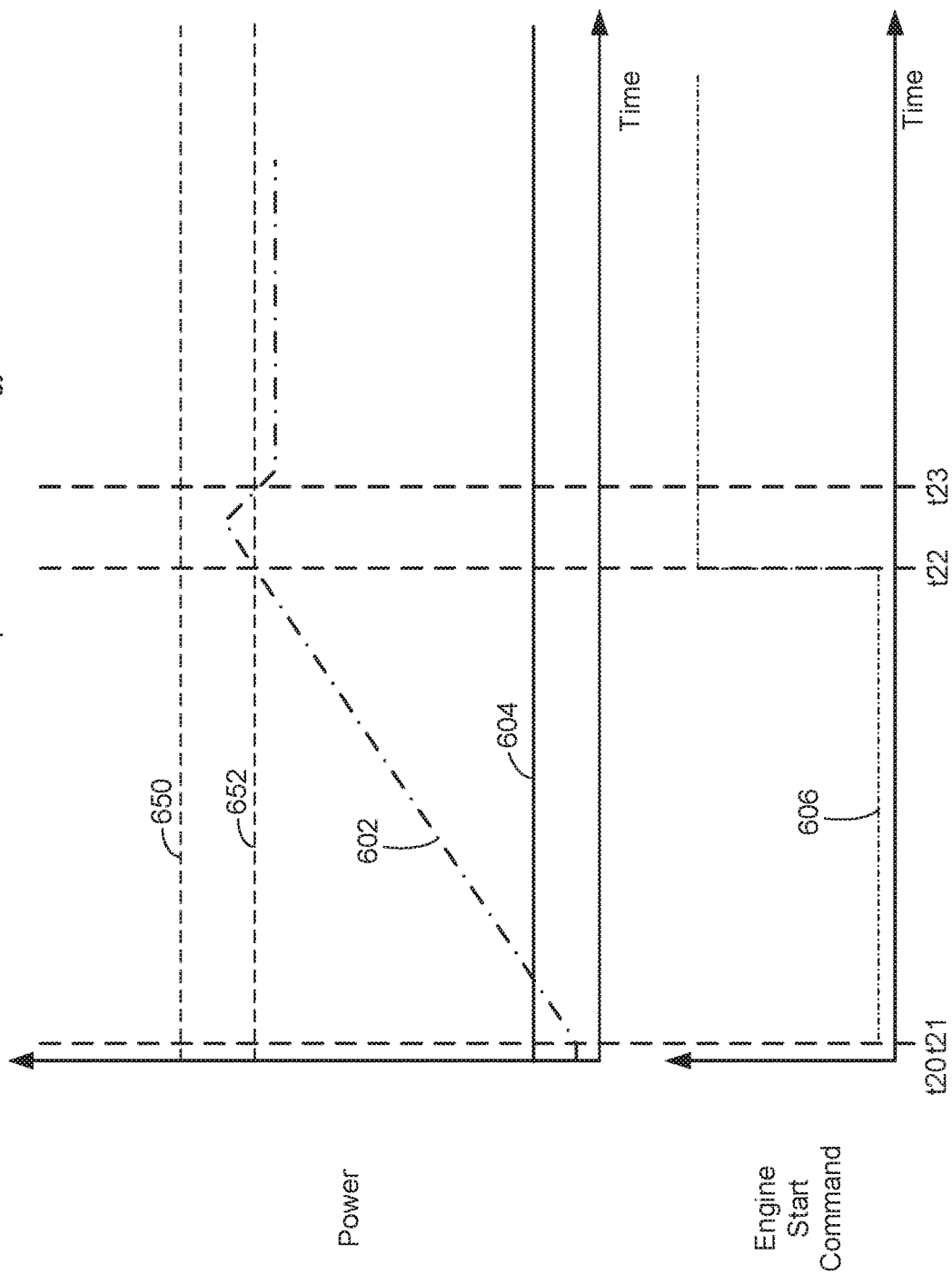
FIG. 6 shows an example of a prior art engine starting sequence.
Figure 7:
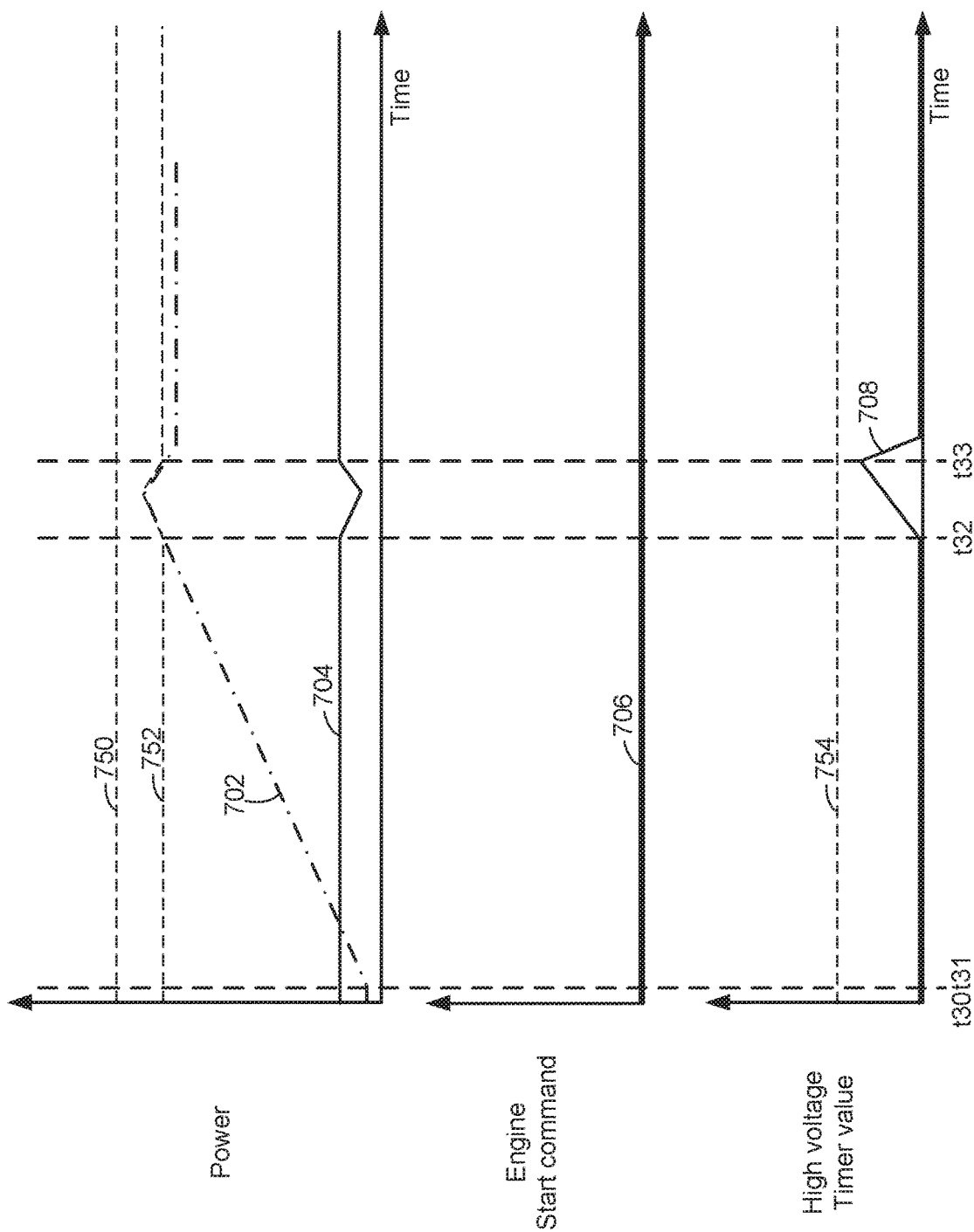
FIGS. 7-9 show example electric machine control sequences according to the method of FIGS. 10A and 10B.
Figure 8:
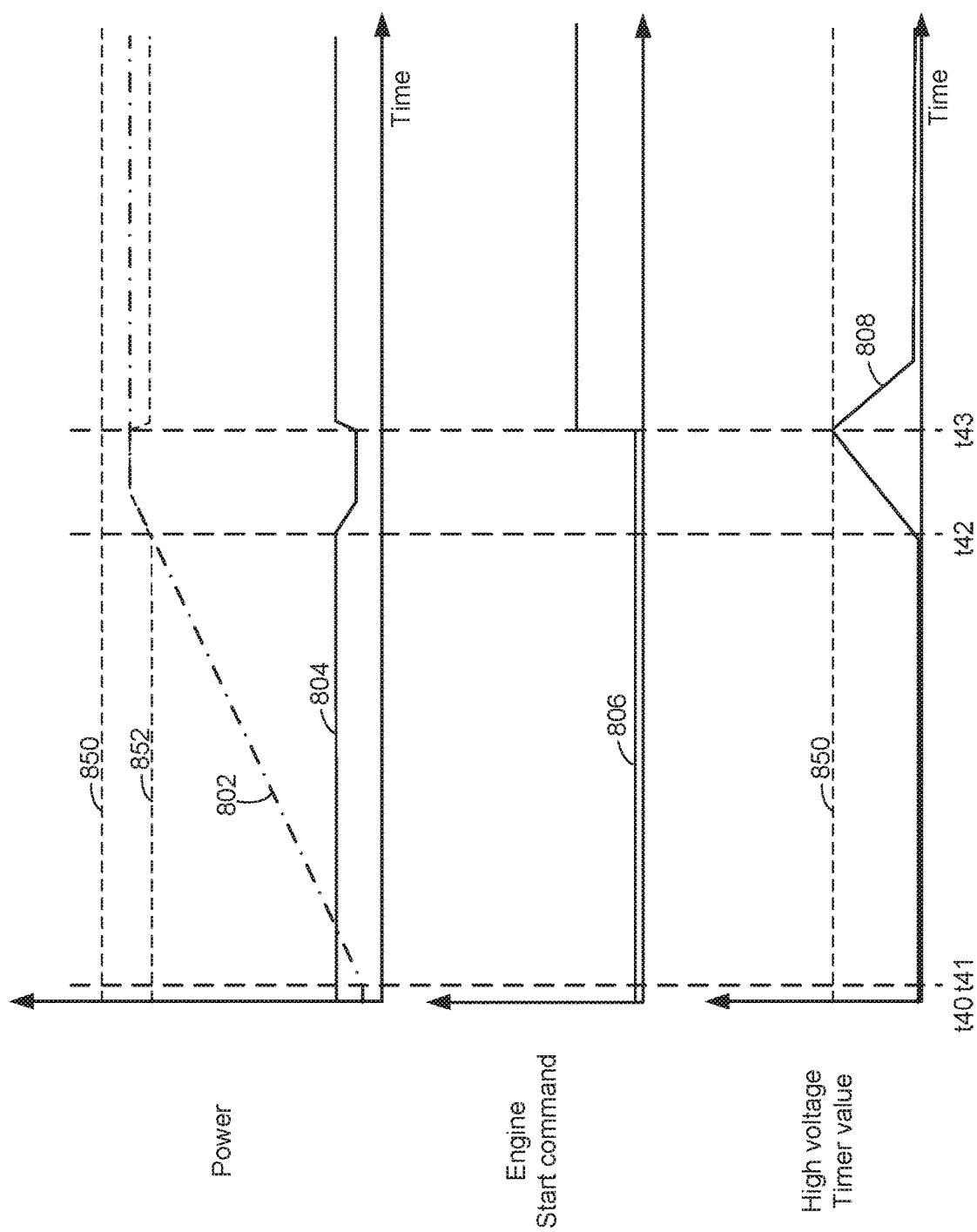
Figure 9:
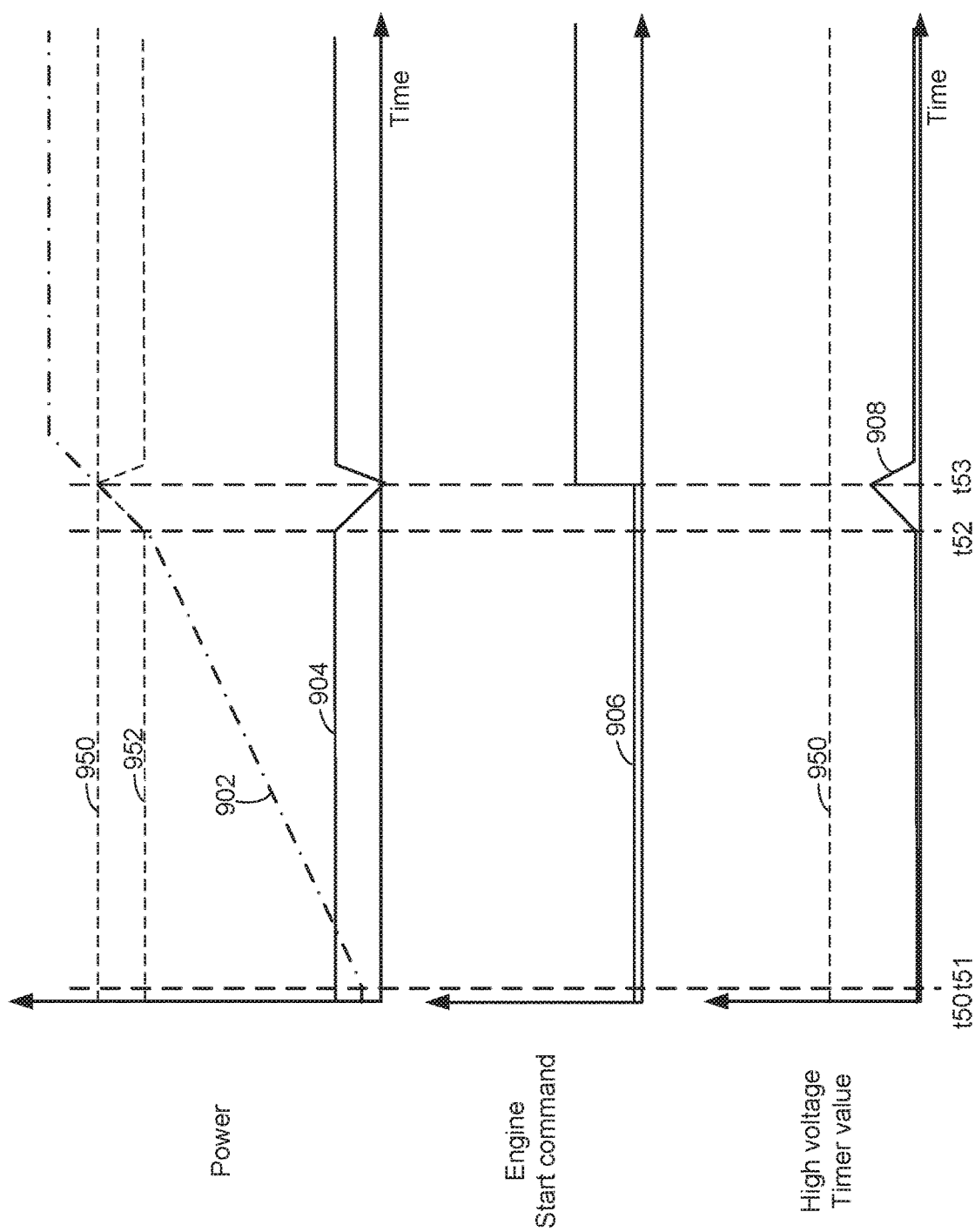
Figure 10A:
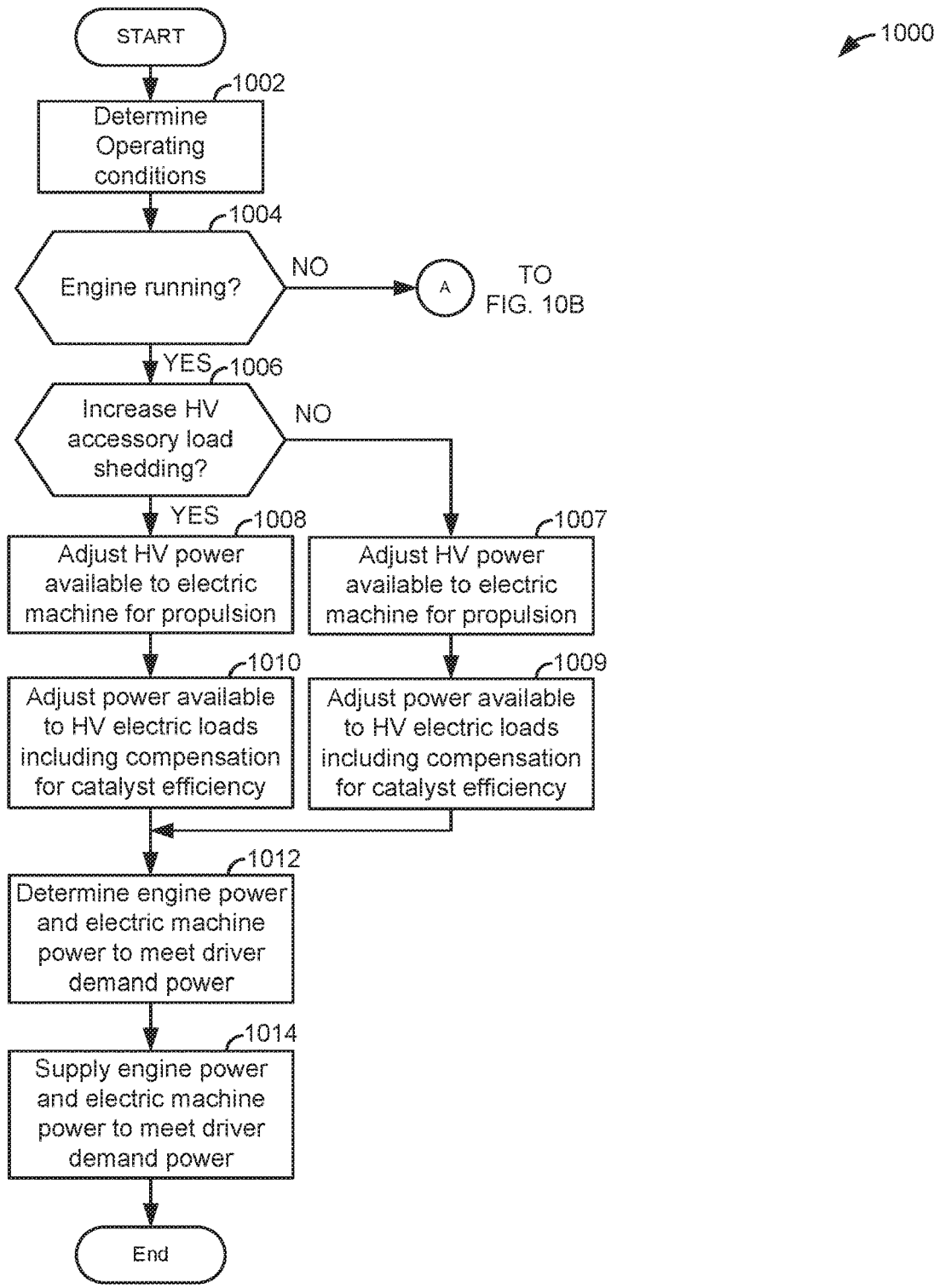
FIGS. 10A and 10B show an example method for controlling an electric machine that provides propulsive power to a driveline and engine starting.
Figure 10B:
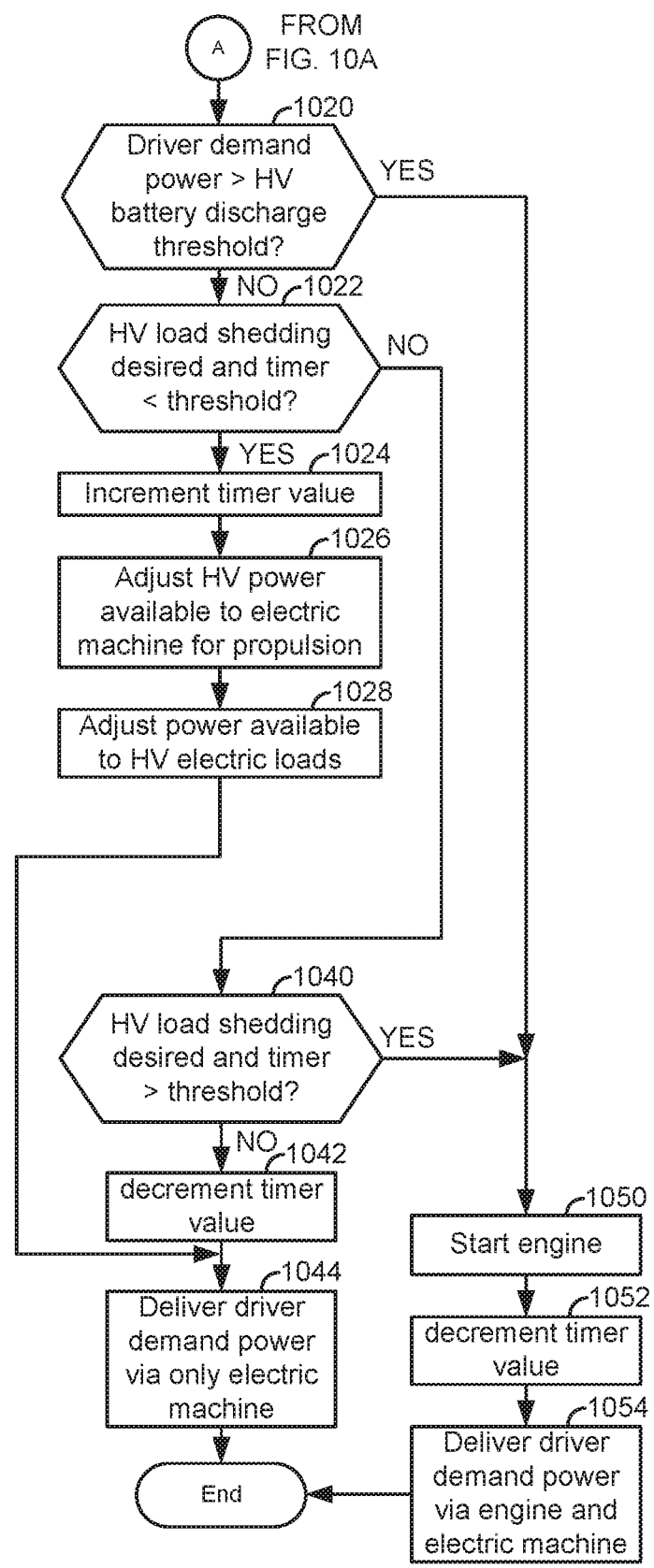
Figure 11:
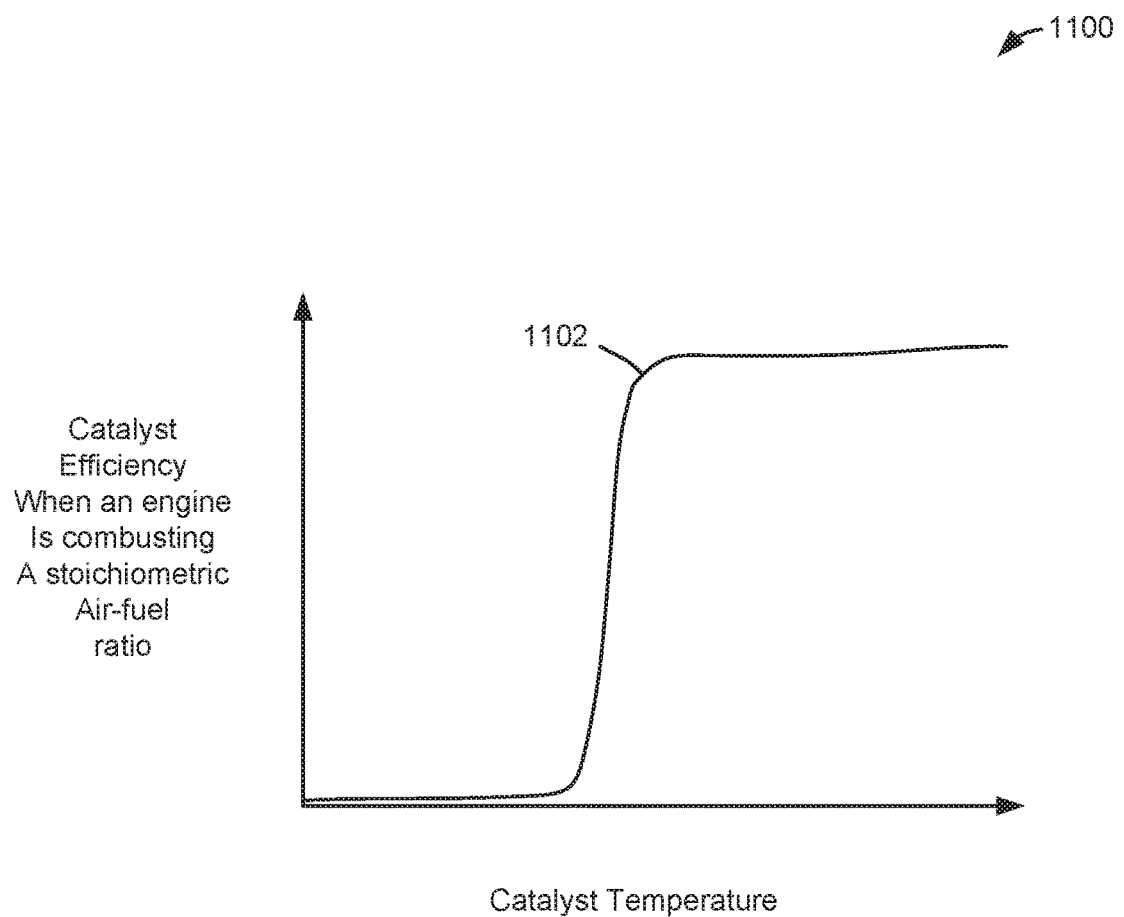
FIG. 11 shows a plot of a function for estimating efficiency of a catalyst.

The present description is related to operating a driveline of a hybrid vehicle that includes an internal combustion engine and an electric machine. Power of a high voltage bus may be directed to an electric machine instead of other high voltage consumers during conditions when it may be possible for higher quantities of hydrocarbons and carbon monoxide to be released to atmosphere so that engine load and emissions may be reduced. In addition, power delivery to the high voltage bus may be prioritized such that engine starting may be less frequent to conserve fuel. The internal combustion engine may be of the type shown in FIG. 1. The engine may be part of a driveline or powertrain that includes a belt integrated starter/generator (BISG) and an integrated starter/generator (ISG) as is shown in FIG. 2. A prior art sequence for controlling an electric machine and an engine is shown in FIG. 3. An electric machine operating sequence and engine starting sequence according to the method of FIGS. 10A and 10B is shown in FIG. 4. An example function for regulating high voltage power that is available to high voltage accessories based on catalyst efficiency is shown in FIG. 5. A prior art engine starting sequence is shown in FIG. 6. FIGS. 7-9 show different scenarios for controlling electric machine power according to the method of FIGS. 10A and 10B. A method for controlling a driveline that includes an internal combustion engine and an electric machine is shown in FIGS. 10A and 10B. A plot of a function describing catalyst efficiency versus catalyst temperature is shown in FIG. 11.

Figure 1:
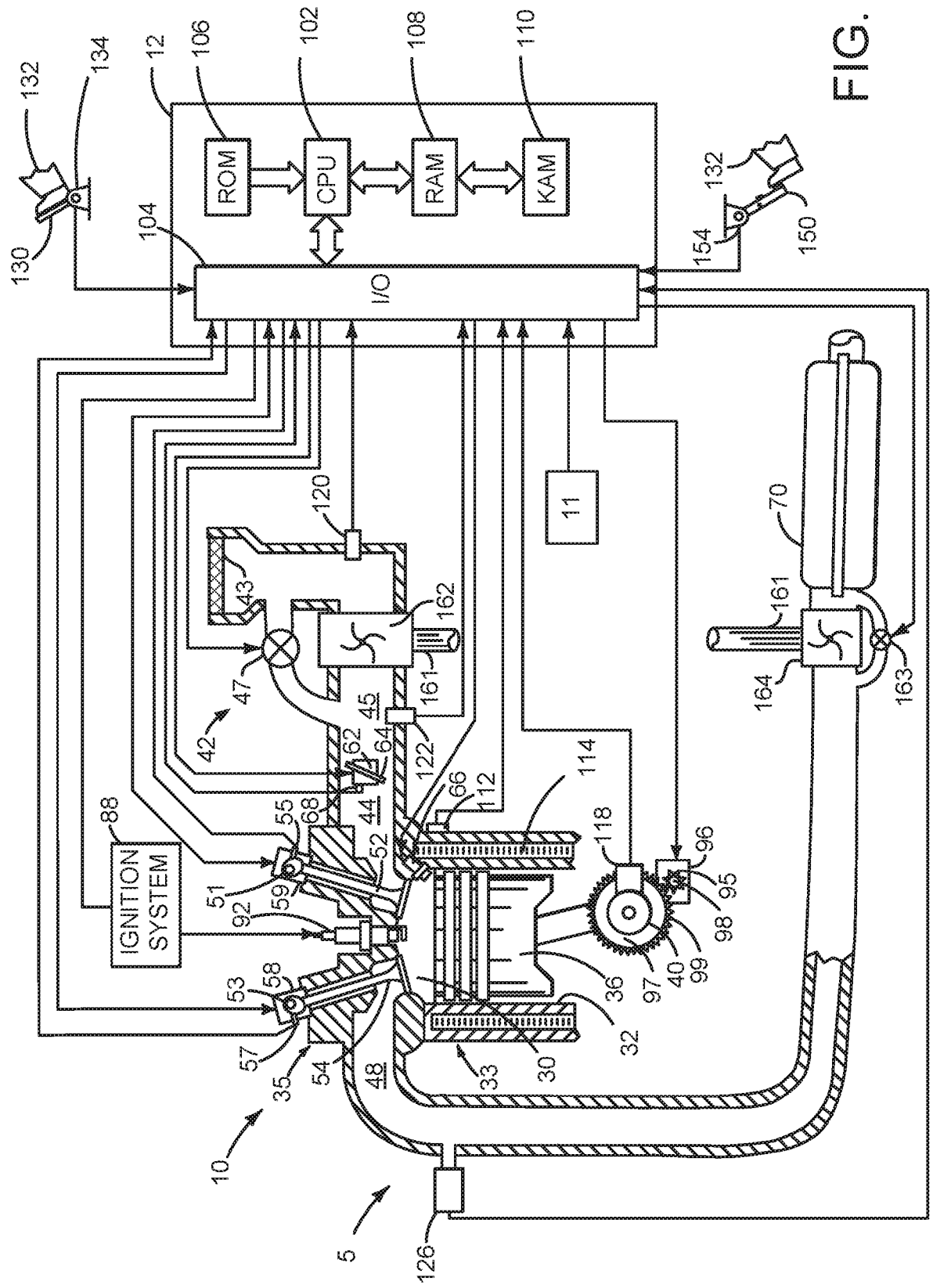
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. Controller 12 employs the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Exhaust system 5 includes exhaust manifold 48 and converter 70. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The driveline of FIG. 2 includes engine 10 shown in FIG. 1. Driveline 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of driveline controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A speed of BISG 219 may be determined via optional BISG speed sensor 203. In some examples, BISG 219 may be simply referred to as an ISG. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG 219 may be mechanically coupled to engine 10 via belt 231 or other means. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 and BISG 219 are electrically coupled to low voltage buss 273. Electric energy storage device 275 is electrically coupled to high voltage buss 274. Low voltage battery 280 selectively supplies electrical energy to starter motor 96 and BISG 219. High voltage buss may supply electrical power to high voltage accessories including positive temperature coefficient (PTC) heaters 266 for heating a passenger compartment of vehicle 225, compressor 267 of climate control system 268 (e.g., a heat pump that cools or heats a passenger cabin), and DC/DC converter 281. Controller 255 or controller 12 may selectively reduce or increase electrical power consumed by the high voltage accessories via commands provide over CAN 299.

An engine output torque may be transmitted to an input or first side of driveline disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to driveline 200 or to convert driveline torque into electrical energy to be stored in electric energy storage device 275 in a regeneration mode. Inverter 265 selectively supplies or receives electrical power to/from ISG 240 to/from high voltage bus 274. ISG 240 has a higher output torque capacity than starter 96 shown in FIG. 1 or BISG 219. Further, ISG 240 directly drives driveline 200 or is directly driven by driveline 200. There are no belts, gears, or chains to couple ISG 240 to driveline 200. Rather, ISG 240 rotates at the same rate as driveline 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to driveline 200 via operating as a motor or generator as instructed by electric machine controller 252. It should be noted that the system shown in FIG. 2 is not the only configuration to which the method described herein may be applied. For example, the electric machine may be included in a series or parallel hybrid driveline.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG torque from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging power (e.g., a negative ISG torque) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power based on vehicle speed and brake pedal position. Vehicle system controller 255 then allocates a fraction of the negative desired wheel power to the ISG 240 (e.g., desired driveline wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative power to transmission input shaft 270, but negative power provided by ISG 240 may be limited by transmission controller 254 which outputs a transmission input shaft negative power limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel power that may not be provided by ISG 240 because of transmission or ISG limits may be allocated to friction brakes 218 so that the desired wheel power is provided by a combination of negative wheel power from friction brakes 218 and ISG 240.

Accordingly, power or torque control of the various driveline components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255.

Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a system, comprising: vehicle driveline including an engine and an electric machine that provide propulsive force to vehicle wheels; a high voltage bus coupled to a plurality of electrical power consumers; and a controller including executable instructions stored in non-transitory memory to decrease an amount of power supplied to at least one of the plurality of electrical power consumers responsive to a driver demand power being greater than an electric energy storage device discharge power upper threshold amount minus an amount of power supplied to the plurality of high voltage accessories. The system further comprises additional instructions to decrease an amount of power supplied to the high voltage accessories responsive to a desired engine power amount plus the electric energy storage device discharge power upper threshold amount minus the amount of power supplied to the high voltage accessories being greater than the driver demand power. The system further comprises additional instructions to increase a threshold amount of electrical power available to the electric machine from a high voltage electric energy storage device proportionate to the decrease in the amount of power supplied to the plurality of high voltage accessories. The system further comprises additional instructions to start the engine responsive to the driver demand power exceeding the electric energy storage device discharge power upper threshold amount. The system further comprises additional instructions to record an amount of time since a most recent time the amount of power supplied to at least one of the plurality of electrical power consumers has been reduced. The system further comprises additional instructions to decrease the amount of time in response to the driver demand being less than the electric energy storage device discharge power upper threshold amount minus an amount of power supplied to the plurality of high voltage accessories.

Referring now to FIG. 3, two plots illustrating a prior art electric machine control sequence are shown. The two plots are time aligned and they occur at a same time. The vertical lines at times t0-t3 represents times of interest in the sequence.

The first plot from the top of FIG. 3 is a plot of power versus time. The vertical axis represents power and power increases in the direction of the vertical axis arrow. The horizontal axis of the first plot represents time and time increases from the left side of the figure to the right side of the figure. Horizontal line 350 represents an upper electric energy storage device discharge power upper threshold amount (e.g., an amount of electrical power being discharged from an electric energy storage device that is not to be exceeded). Horizontal line 352 represents a threshold amount of electrical power available to an electric machine (e.g., ISG 240) from a high voltage electric energy storage device (e.g., an amount of electrical power supplied to an electric machine 240 from an electric energy storage device that is not to be exceeded). Solid line 304 represents an amount of electrical power provided to high voltage accessories (e.g., a climate control system compressor, DC/DC converter, and PTC heaters). Dashed dot line 302 represents a driver demand power (e.g., an amount of power requested by a vehicle's human driver or autonomous driver to provide power to vehicle wheels).

The second plot from the top of FIG. 3 is a plot of torque versus time. The vertical axis represents torque and torque increases in the direction of the vertical axis arrow. The horizontal axis of the second plot represents time and time increases from the left side of the figure to the right side of the figure. Solid line 308 represents engine torque or requested engine torque. Dash-dot line 306 represents electric machine torque or requested electric machine torque.

At time t0, the driver demand power is low and the amount of electrical power provided to high voltage accessories is at a medium level and constant. The electric motor torque output is low and the engine torque output is low.

At time t1, the driver demand power begins to increase and the electric machine torque is increased to meet the driver demand power. The engine torque remains at its previous level and the amount of electrical power provided to high voltage accessories remains at its previous level.

Between time t1 and time t2, the driver demand power continues to increase and the electric machine torque is increased to meet the driver demand power. The engine torque remains at its previous level and the amount of electrical power provided to high voltage accessories remains at its previous level.

At time t2, the driver demand power reaches threshold 352 and the engine torque is increased to meet the driver demand power. The electric machine torque is not increased since the electric machine power plus power provided to the high voltage accessories is equal to the upper electric energy storage device discharge power upper threshold amount. Thus, the engine power output is increased when electric machine power plus power provided to the high voltage accessories is equal to the upper electric energy storage device discharge power upper threshold amount when driver demand power is increasing so that driver demand power may be met. However, during conditions when the engine is cold and the catalyst is cold, the higher engine loads may increase hydrocarbon and carbon monoxide emissions.

Between time t2 and time t3, the driver demand power continues to increase and the electric machine torque is held at its previous amount. The engine torque is increased to meet the driver demand power in combination with the electric machine torque. The amount of electrical power provided to high voltage accessories remains at its previous level.

At time t3, the driver demand power exceeds the upper electric energy storage device discharge power upper threshold amount, but the driver demand power is still met by increasing the engine torque. The electric machine torque remains unchanged and the electrical power amount supplied to the high voltage accessories remains at its previous level.

Thus, while the prior art method may meet driver demand power, engine emissions may be higher than is desired since the engine may be operated at higher output levels. Further, if the high voltage accessory load is high, engine torque may be increased for even smaller driver demand power levels so that engine emissions may increase earlier in a vehicle drive cycle when catalyst efficiency may be low.

Referring now to FIG. 4, two prophetic plots illustrating an electric machine control sequence are shown. The two plots are time aligned and they occur at a same time. The vertical lines at times t10-t13 represents times of interest in the sequence. The sequence may be performed via the system of FIGS. 1 and 2 in cooperation with the method of FIGS. 10A and 10B.

The first plot from the top of FIG. 4 is a plot of power versus time. The vertical axis represents power and power increases in the direction of the vertical axis arrow. The horizontal axis of the first plot represents time and time increases from the left side of the figure to the right side of the figure. Horizontal line 450 represents an upper electric energy storage device discharge power upper threshold amount (e.g., an amount of electrical power being discharged from an electric energy storage device that is not to be exceeded). Horizontal line 452 represents a threshold amount of electrical power available to an electric machine (e.g., ISG 240) from a high voltage electric energy storage device (e.g., an amount of electrical power supplied to an electric machine from an electric energy storage device that is not to be exceeded). Solid line 404 represents an amount of electrical power provided to high voltage accessories (e.g., a climate control system compressor, DC/DC converter, and PTC heaters). Dashed dot line 402 represents a driver demand power (e.g., an amount of power requested by a vehicle's human driver or autonomous driver to provide power to vehicle wheels).

The second plot from the top of FIG. 4 is a plot of torque versus time. The vertical axis represents torque and torque increases in the direction of the vertical axis arrow. The horizontal axis of the second plot represents time and time increases from the left side of the figure to the right side of the figure. Solid line 408 represents engine torque or requested engine torque. Dash-dot line 406 represents electric machine torque or requested electric machine torque.

At time t10, the driver demand power is low and the amount of electrical power provided to high voltage accessories is at a medium level and constant. The electric motor torque output is low and the engine torque output is low.

At time t11, the driver demand power begins to increase and the electric machine torque is increased to meet the driver demand power. The engine torque remains at its previous level and the amount of electrical power provided to high voltage accessories remains at its previous level.

Between time t11 and time t12, the driver demand power continues to increase and the electric machine torque is increased to meet the driver demand power. The engine torque remains at its previous level and the amount of electrical power provided to high voltage accessories remains at its previous level.

At time t12, the driver demand power reaches threshold 452 and the amount of electrical power supplied to the high voltage accessories is reduced in response to the driver demand power reaching threshold 452. In one example, the amount of power that the high voltage accessories is reduced by is equal to the amount of power that the driver demand power exceeds the threshold amount of electrical power available to an electric machine, at least while driver demand power is less than the upper electric energy storage device discharge power upper threshold amount. The threshold amount of electrical power available to an electric machine (e.g., 452) is increased by the amount of power that is withdrawn from the high voltage accessories. This allows additional power to be delivered to the electric machine, thereby increasing the torque output by the electric machine. Thus, the output torque of the electric machine begins to increase further in response to power being withdrawn from the high voltage accessories, which are supplied power via a high voltage battery or electric energy storage device 275. The engine output torque remains at its previous level.

Between time t12 and time t13, the driver demand power continues to increase and the electric machine torque is increased as the driver demand power increases. In addition, the amount of electrical power supplied to the high voltage accessories continues to be reduced as the driver demand power continues to increase. The threshold amount of electrical power available to an electric machine (e.g., 452) also continues to increase by the amount of power that is withdrawn from the high voltage accessories. The engine output torque remains at its previous level.

At time t13, the driver demand power exceeds the upper electric energy storage device discharge power upper threshold amount. Therefore, no additional electrical power is provided to the electric machine, but the driver demand power is still met by increasing the engine torque. The electrical power amount supplied to the high voltage accessories reaches a value of zero. Engine torque output is increased after time t13 to meet high driver power demand levels.

Thus, electrical power supplied to high voltage accessory loads that are electrically coupled to the high voltage bus may be reduced after the amount of electrical power supplied to high voltage accessories plus power supplied to the electric machine that propels the vehicle is equal to the upper electric energy storage device discharge power upper threshold amount. This allows additional electrical power to be diverted to the electric machine from the electric energy storage device so that engine power may not have to be increased to meet driver demand power. Consequently, engine emissions may be reduced after engine starting when an engine is cold.

Referring now to FIG. 5, an example function that shows an amount of high voltage power that may be available to high voltage accessories versus catalyst efficiency is shown. The vertical axis represents an amount of electrical power (e.g., kilo watts (Kw)) that may be made available to high voltage electrical accessories or consumers after driver demand power is greater than a high voltage battery or electric energy storage device discharge power that is available to an electric machine (e.g., 240 of FIG. 2). Electrical power that is available to the electrical accessories is an amount of electric power that is not to be exceeded by the amount of power that is supplied to the electric machine.

It may be observed that when catalyst efficiency is low, the amount of electrical power that is available to the high voltage electrical accessories is low. As the catalyst efficiency increases, the amount of electrical power that is available to the high voltage electrical accessories increases. Consequently, when catalyst efficiency is low, a lower amount of electrical power is available to high voltage electrical accessories and a greater amount of electrical power is made available to the electric machine that may provide propulsive power to the driveline. This allows the electric machine output to be greater at lower catalyst temperatures so that engine load may be reduced, thereby improving engine emissions. At high catalyst efficiency levels, a greater amount of electrical power is made available to high voltage electrical accessories and a lesser amount of electrical power is made available to the electric machine. Increasing the amount of electrical power that is available to high voltage accessories allows the high voltage accessories to operate at full capacity. In this example, less than 2 Kw may be provided to high voltage accessories when catalyst efficiency is 50% and 8 Kw may be provided to high voltage accessories when catalyst efficiency is near 100%.

Referring now to FIG. 6, two plots illustrating a prior art engine starting sequence are shown. The two plots are time aligned and they occur at a same time. The vertical lines at times t20-t23 represents times of interest in the sequence.

The first plot from the top of FIG. 6 is a plot of power versus time. The vertical axis represents power and power increases in the direction of the vertical axis arrow. The horizontal axis of the first plot represents time and time increases from the left side of the figure to the right side of the figure. Horizontal line 650 represents an upper electric energy storage device discharge power upper threshold amount (e.g., an amount of electrical power being discharged from an electric energy storage device that is not to be exceeded). Horizontal line 652 represents a threshold amount of electrical power available to an electric machine (e.g., ISG 240) from a high voltage electric energy storage device (e.g., an amount of electrical power supplied to an electric machine from an electric energy storage device that is not to be exceeded). Dashed dot line 602 represents a driver demand power (e.g., an amount of power requested by a vehicle's human driver or autonomous driver to provide power to vehicle wheels). Solid line 604 represents an amount of electrical power may be provided to high voltage accessories (e.g., a climate control system compressor, DC/DC converter, and PTC heaters).

The second plot from the top of FIG. 6 is a plot of an engine starting command versus time. The vertical axis represents state of the engine starting command and the engine is commanded to start and run (e.g., combust fuel) when trace 606 is at a higher level near the vertical axis arrow. The engine is not commanded to start when trace 606 is at a lower level near the horizontal axis. The horizontal axis of the second plot represents time and time increases from the left side of the figure to the right side of the figure. Dash-dot line 606 represents the state of the engine start command.

At time t20, the driver demand power is low and the amount of electrical power provided to high voltage accessories is at a medium level and constant. The engine is stopped (e.g., not running and combusting).

At time t21, the driver demand power begins to increase. The engine remains stopped and the amount of electrical power provided to high voltage accessories remains at its previous level.

Between time t21 and time t22, the driver demand power continues to increase. The engine remains stopped and the amount of electrical power provided to high voltage accessories remains at its previous level.

At time t22, the driver demand power reaches threshold 652 and the engine is started to meet the driver demand power. The electric machine torque is (not shown) not increased since the electric machine power plus power provided to the high voltage accessories is equal to the upper electric energy storage device discharge power upper threshold amount. Thus, the engine is started when electric machine power plus power provided to the high voltage accessories is equal to the upper electric energy storage device discharge power upper threshold amount when driver demand power is increasing so that driver demand power may be met.

Between time t22 and time t23, the driver demand power continues to increase and the engine torque is increased (not shown) to meet the driver demand power. Then, the driver demand power is reduced, but the engine continues to run since it has been started and stopping the engine so soon after starting the engine may be inefficient. The electrical power amount that is supplied to the high voltage accessories remains at its previous level.

At time t3, the driver demand power is reduced to a level that is less than threshold 652, but the engine remains running so that the engine may recharge the electric energy storage device. The electrical power amount that is supplied to the high voltage accessories remains at its previous level.

Thus, while the prior art method may meet driver demand power, the engine may be started and run only for a short period of time before the engine's power is not needed to meet the driver demand power. Consequently, driveline efficiency may be reduced and engine emissions may be increased.

Referring now to FIG. 7, three plots illustrating an example electric machine control sequence are shown. The three plots are time aligned and they occur at a same time. The vertical lines at times t30-t33 represent times of interest in the sequence. The sequence may be performed via the system of FIGS. 1 and 2 in cooperation with the method of FIGS. 10A and 10B.

The first plot from the top of FIG. 7 is a plot of power versus time. The vertical axis represents power and power increases in the direction of the vertical axis arrow. The horizontal axis of the first plot represents time and time increases from the left side of the figure to the right side of the figure. Horizontal line 750 represents an upper electric energy storage device discharge power upper threshold amount (e.g., an amount of electrical power being discharged from an electric energy storage device that is not to be exceeded). Horizontal line 752 represents a threshold amount of electrical power available to an electric machine (e.g., ISG 240) from a high voltage electric energy storage device (e.g., an amount of electrical power supplied to an electric machine from an electric energy storage device that is not to be exceeded). Dashed dot line 702 represents a driver demand power (e.g., an amount of power requested by a vehicle's human driver or autonomous driver to provide power to vehicle wheels). Solid line 704 represents an amount of electrical power provided to high voltage accessories (e.g., a climate control system compressor, DC/DC converter, and PTC heaters).

The second plot from the top of FIG. 7 is a plot of an engine starting command versus time. The vertical axis represents state of the engine starting command and the engine is commanded to start and run (e.g., combust fuel) when trace 706 is at a higher level near the vertical axis arrow. The engine is not commanded to start when trace 706 is at a lower level near the horizontal axis. The horizontal axis of the second plot represents time and time increases from the left side of the figure to the right side of the figure. Solid line 706 represents the state of the engine start command.

The third plot from the top of FIG. 7 is a plot of a high voltage load shed timer value versus time. The vertical axis represents the high voltage load shed timer value and the value of the high voltage load shed timer increased in the direction of the vertical axis arrow. The value of the high voltage load shed timer is zero when trace 708 is at a lower level near the horizontal axis. The horizontal axis of the third plot represents time and time increases from the left side of the figure to the right side of the figure. Solid line 708 represents the high voltage load shed timer value. Horizontal line 754 represents a high voltage load shed timer upper threshold (e.g., a high voltage load shed timer value that is not to be exceeded).

At time t30, the driver demand power is low and the amount of electrical power provided to high voltage accessories is at a medium level and constant. The value of the high voltage load shed timer is zero since an amount of electrical power delivered to high voltage accessories is not being reduced due to high driver demand power.

At time t31, the driver demand power begins to increase. The amount of electrical power provided to high voltage accessories remains at its previous value. The engine remains stopped. The value of the high voltage load shed timer is zero since an amount of electrical power delivered to high voltage accessories is not being reduced due to high driver demand power.

Between time t31 and time t32, the driver demand power continues to increase. The engine remains stopped and the amount of electrical power provided to high voltage accessories remains at its previous level. The value of the high voltage load shed timer is zero since an amount of electrical power delivered to high voltage accessories is not being reduced due to high driver demand power.

At time t32, the driver demand power reaches threshold 752, but the engine is not started to meet the driver demand power. Rather, the amount of electrical power supplied to the high voltage electric consumers is reduced and the threshold amount of electrical power available to an electric machine (e.g., 240) is increased by the amount of electrical power that is withdrawn from the high voltage accessories. This allows the amount of electrical power that is supplied to the electric machine to be increased (not show) to meet the driver demand power. In one example, the amount of power that the high voltage accessories is reduced by is equal to the amount of power that the driver demand power exceeds the threshold amount of electrical power available to an electric machine, at least while driver demand power is less than the upper electric energy storage device discharge power upper threshold amount. The threshold amount of electrical power available to an electric machine (e.g., 752) is increased by the amount of power that is withdrawn from the high voltage accessories. This allows additional power to be delivered to the electric machine (not shown), thereby increasing the torque output by the electric machine (not shown). Therefore, the output torque of the electric machine begins to increase (not shown) further in response to power being withdrawn from the high voltage accessories, which are supplied power via a high voltage battery or electric energy storage device 275. The value of the high voltage load shed time begins increasing since electrical load or power supplied to high voltage accessories is being reduced so that the electric machine may meet driver demand power.

Between time t32 and time t33, the driver demand power continues to increase and the amount of electrical power that is supplied to the high voltage electric consumers is reduce in proportion to the increase in the driver demand power. The threshold amount of electrical power available to an electric machine (e.g., 752) also continues to increase by the amount of power that is withdrawn from the high voltage accessories. Then, the driver demand power is reduced and the amount of electrical power that is supplied to the high voltage electric consumers increases in proportion to the decrease in driver demand power so that output of high voltage accessories may be increased. The threshold amount of electrical power available to an electric machine (e.g., 752) then decrease by the amount of power that is available to the high voltage accessories. The engine remains stopped since the driver demand power is less than threshold 750 and because the value of the high voltage load shed timer is less than threshold 754.

At time t33, the driver demand power is reduced to a level that is less than threshold 752. The engine remains stopped and the value of the high voltage load shed timer starts to be reduced. The threshold amount of electrical power available to an electric machine (e.g., 752) carries on at a constant level that is based on the amount of power that is available to the high voltage accessories.

Thus, because electrical power that is provided to high voltage accessories was reduced in response to increasing driver demand power, the engine may remain stopped while driver demand power is met by the electric machine. This may conserve fuel and reduce engine emissions.

Referring now to FIG. 8, three plots illustrating a second example electric machine control sequence are shown. The three plots are time aligned and they occur at a same time. The vertical lines at times t40-t43 represents times of interest in the sequence. The sequence may be performed via the system of FIGS. 1 and 2 in cooperation with the method of FIGS. 10A and 10B.

The first plot from the top of FIG. 8 is a plot of power versus time. The vertical axis represents power and power increases in the direction of the vertical axis arrow. The horizontal axis of the first plot represents time and time increases from the left side of the figure to the right side of the figure. Horizontal line 850 represents an upper electric energy storage device discharge power upper threshold amount (e.g., an amount of electrical power being discharged from an electric energy storage device that is not to be exceeded). Horizontal line 852 represents a threshold amount of electrical power available to an electric machine (e.g., ISG 240) from a high voltage electric energy storage device (e.g., an amount of electrical power supplied to an electric machine from an electric energy storage device that is not to be exceeded). Dashed dot line 802 represents a driver demand power (e.g., an amount of power requested by a vehicle's human driver or autonomous driver to provide power to vehicle wheels). Solid line 804 represents an amount of electrical power provided to high voltage accessories (e.g., a climate control system compressor, DC/DC converter, and PTC heaters).

The second plot from the top of FIG. 8 is a plot of an engine starting command versus time. The vertical axis represents state of the engine starting command and the engine is commanded to start and run (e.g., combust fuel) when trace 806 is at a higher level near the vertical axis arrow. The engine is not commanded to start when trace 806 is at a lower level near the horizontal axis. The horizontal axis of the second plot represents time and time increases from the left side of the figure to the right side of the figure. Solid line 806 represents the state of the engine start command.

The third plot from the top of FIG. 8 is a plot of a high voltage load shed timer value versus time. The vertical axis represents the high voltage load shed timer value and the value of the high voltage load shed timer increases in the direction of the vertical axis arrow. The value of the high voltage load shed timer is zero when trace 808 is at a lower level near the horizontal axis. The horizontal axis of the third plot represents time and time increases from the left side of the figure to the right side of the figure. Solid line 808 represents the high voltage load shed timer value. Horizontal line 850 represents a high voltage load shed timer upper threshold (e.g., a high voltage load shed timer value that is not to be exceeded).

At time t40, the driver demand power is low and the amount of electrical power provided to high voltage accessories is at a medium level and constant. The value of the high voltage load shed timer is zero since an amount of electrical power delivered to high voltage accessories is not being reduced due to high driver demand power.

At time t41, the driver demand power begins to increase. The amount of electrical power provided to high voltage accessories remains at its previous value. The engine remains stopped. The value of the high voltage load shed timer is zero since an amount of electrical power delivered to high voltage accessories is not being reduced due to high driver demand power.

Between time t41 and time t42, the driver demand power continues to increase. The engine remains stopped and the amount of electrical power provided to high voltage accessories remains at its previous level. The value of the high voltage load shed timer is zero since an amount of electrical power delivered to high voltage accessories is not being reduced due to high driver demand power.

At time t42, the driver demand power reaches threshold 852, but the engine is not started to meet the driver demand power. Instead, the amount of electrical power supplied to the high voltage electric consumers is reduced and the threshold amount of electrical power available to an electric machine is increased by the amount of electrical power that is withdrawn from the high voltage accessories. This allows the amount of electrical power that is supplied to the electric machine to be increased (not show) to meet the driver demand power. In one example, the amount of power that the high voltage accessories is reduced by is equal to the amount of power that the driver demand power exceeds the threshold amount of electrical power available to an electric machine, at least while driver demand power is less than the upper electric energy storage device discharge power upper threshold amount. The threshold amount of electrical power that is available to an electric machine (e.g., 852) is increased by the amount of power that is withdrawn from the high voltage accessories. This allows additional power to be delivered to the electric machine (not shown), thereby increasing the torque output by the electric machine (not shown). As a result, the output torque of the electric machine begins to increase (not shown) further in response to power being withdrawn from the high voltage accessories, which are supplied power via a high voltage battery or electric energy storage device 275. The value of the high voltage load shed time begins increasing since electrical load or power supplied to high voltage accessories is being reduced so that the electric machine may meet driver demand power.

Between time t42 and time t43, the driver demand power increases and then levels off at a constant value between threshold 850 and threshold 852. The threshold amount of electrical power available to an electric machine also increases and then levels off since the driver demand power levels off and since the amount of electrical power supplied to the high voltage accessories ceases decreasing. The engine remains stopped and the high voltage load shed timer value continues to increase.

At time t43, the driver demand power remains high, but the value of the high voltage load shed timer exceeds threshold 850 so the engine is started. Torque from the engine (not shown) is delivered to the driveline so that the threshold amount of electrical power available to the electric machine is reduced and so that the amount of electrical power provided to high voltage accessories may be increased. The high voltage load shed timer value is decreased in response to the engine torque being applied to meet driver demand power and the amount of electrical energy that is provided to the electric machine being less than threshold 852 (not shown).

In this way, the engine may be started to meet driver demand power after an amount of electrical power provided to high voltage accessories has been reduced for a predetermined amount of time so that driver demand power may be met by the electric machine. These actions may conserve fuel and reduce engine emissions while still allowing the engine to start after electric power provided to high voltage accessories has been reduced for an extended period of time.

Referring now to FIG. 9, three plots illustrating a second example electric machine control sequence are shown. The three plots are time aligned and they occur at a same time. The vertical lines at times t50-t53 represents times of interest in the sequence. The sequence may be performed via the system of FIGS. 1 and 2 in cooperation with the method of FIGS. 10A and 10B.

The first plot from the top of FIG. 9 is a plot of power versus time. The vertical axis represents power and power increases in the direction of the vertical axis arrow. The horizontal axis of the first plot represents time and time increases from the left side of the figure to the right side of the figure. Horizontal line 950 represents an upper electric energy storage device discharge power upper threshold amount (e.g., an amount of electrical power being discharged from an electric energy storage device that is not to be exceeded). Horizontal line 952 represents a threshold amount of electrical power available to an electric machine (e.g., ISG 240) from a high voltage electric energy storage device (e.g., an amount of electrical power supplied to an electric machine from an electric energy storage device that is not to be exceeded). Dashed dot line 902 represents a driver demand power (e.g., an amount of power requested by a vehicle's human driver or autonomous driver to provide power to vehicle wheels). Solid line 904 represents an amount of electrical power provided to high voltage accessories (e.g., a climate control system compressor, DC/DC converter, and PTC heaters).

The second plot from the top of FIG. 9 is a plot of an engine starting command versus time. The vertical axis represents state of the engine starting command and the engine is commanded to start and run (e.g., combust fuel) when trace 906 is at a higher level near the vertical axis arrow. The engine is not commanded to start when trace 906 is at a lower level near the horizontal axis. The horizontal axis of the second plot represents time and time increases from the left side of the figure to the right side of the figure. Solid line 906 represents the state of the engine start command.

The third plot from the top of FIG. 9 is a plot of a high voltage load shed timer value versus time. The vertical axis represents the high voltage load shed timer value and the value of the high voltage load shed timer increases in the direction of the vertical axis arrow. The value of the high voltage load shed timer is zero when trace 908 is at a lower level near the horizontal axis. The horizontal axis of the third plot represents time and time increases from the left side of the figure to the right side of the figure. Solid line 908 represents the high voltage load shed timer value. Horizontal line 950 represents a high voltage load shed timer upper threshold (e.g., a high voltage load shed timer value that is not to be exceeded).

At time t50, the driver demand power is low and the amount of electrical power provided to high voltage accessories is at a medium level and constant. The value of the high voltage load shed timer is zero since an amount of electrical power delivered to high voltage accessories is not being reduced due to high driver demand power.

At time t51, the driver demand power begins to increase. The amount of electrical power provided to high voltage accessories remains at its previous value. The engine remains stopped. The value of the high voltage load shed timer is zero since an amount of electrical power delivered to high voltage accessories is not being reduced due to high driver demand power.

Between time t51 and time t52, the driver demand power continues to increase. The engine remains stopped and the amount of electrical power provided to high voltage accessories remains at its previous level. The value of the high voltage load shed timer is zero since an amount of electrical power delivered to high voltage accessories is not being reduced due to high driver demand power.

At time t52, the driver demand power reaches threshold 952, but the engine is not started to meet the driver demand power. Instead, the amount of electrical power supplied to the high voltage electric consumers is reduced and the threshold amount of electrical power available to an electric machine is increased by the amount of electrical power that is withdrawn from the high voltage accessories. This allows the amount of electrical power that is supplied to the electric machine to be increased (not show) to meet the driver demand power. The amount of power that the high voltage accessories may be reduced by is equal to the amount of power that the driver demand power exceeds the threshold amount of electrical power available to an electric machine, at least while driver demand power is less than the upper electric energy storage device discharge power upper threshold amount. The threshold amount of electrical power available to an electric machine (e.g., 952) is increased by the amount of power that is withdrawn from the high voltage accessories. This allows additional power to be delivered to the electric machine (not shown), thereby increasing the torque output by the electric machine (not shown). As a result, the output torque of the electric machine begins to increase (not shown) further in response to power being withdrawn from the high voltage accessories, which are supplied power via a high voltage battery or electric energy storage device 275. The value of the high voltage load shed timer begins increasing since electrical load or power supplied to high voltage accessories is being reduced so that the electric machine may meet driver demand power.

Between time t52 and time t53, the driver demand power continues to increase. The amount of electrical power supplied to the high voltage accessories continues to be reduced as the driver demand power continues to increase. The engine remains stopped and the value of the high voltage load timer continues to increase since the amount of electrical power that is supplied to the high voltage accessories is reduced.

At time t53, the driver demand power increases to exceed threshold 950. Therefore, the engine is started so that the driver demand power may be met by the electric machine and the engine. The engine may be started even though the value of the high voltage load timer has not exceeded threshold 950. Once the engine is started, power from the engine is supplied to the driveline after time t53 so that the amount of electrical power supplied to the high voltage accessories may be increased. The value of the high voltage load shed timer is decreased in response to the amount of electrical power being supplied to the high voltage accessories increasing.

In this way, the engine may be started to meet driver demand power after driver demand power exceeds threshold 950 even if the value of the high voltage load shed timer is less than threshold 950. These actions may permit driver demand power to be met during heavy load conditions while also providing electric power provided to high voltage accessories.

Referring now to FIGS. 10A and 10B, a flow chart of a method for operating an engine of a vehicle driveline is shown. The method of FIGS. 10A and 10B may be incorporated into and may cooperate with the system of FIGS. 1 and 2. Further, at least portions of the method of FIGS. 10A and 10B may be incorporated as executable instructions stored in non-transitory memory while other portions of the method may be performed via a controller transforming operating states of devices and actuators in the physical world.

At 1002, method 1000 determines operation conditions. Operating conditions may include but are not limited to engine speed, engine temperature, BISG torque, ISG torque, driver demand power, engine load, ambient temperature, ambient pressure, vehicle speed, and BISG speed. Method 1000 proceeds to 1004.

At 1004, method 1000 judges if the engine is running (e.g., combusting fuel). Method 1000 may judge that the engine is running if fuel is being injected to the engine and engine speed is greater than a threshold speed. If method 1000 judges the engine is running, the answer is yes and method 1000 proceeds to 1006. Otherwise, the answer is no and method 1000 proceeds to 1020.

At 1006, method 1000 judges if an increase in high voltage accessory load shedding (e.g., a reduction of electrical power supplied to accessories that are electrically coupled to the high voltage bus) is desired. In one example, method may judge that an increase in high voltage accessory load shedding is desired when a driver demand power is greater than a desired engine power plus an electric energy storage device discharge power upper threshold amount minus an amount of power being supplied to high voltage accessories or accessories that are coupled to a high voltage bus. These conditions may be expressed as:

$$DD\_power > D\_eng\_power + SD\_disc\_lim - HV\_acc$$

where DD_power is driver demand power, D_eng_power is desired engine power, SD_disc_lim is an electric energy storage device discharge power upper threshold amount of power (e.g., 450 of FIG. 4), and HV_acc is an amount of electrical power that may be supplied to accessories that are electrically coupled to a high voltage bus (e.g., conductors that transfer charge from a high voltage power source). If method 1000 judges that driver demand power is greater than a desired engine power plus an electric energy storage device discharge power upper threshold amount minus an amount of power being supplied to high voltage accessories or accessories that are coupled to a high voltage bus, then the answer is yes and method 1000 proceeds to 1008. Otherwise, the answer is no and method 1000 proceeds to 1007.

At 1008, method 1000 increases the threshold amount of electrical power that is available to an electric machine (e.g., threshold 452 in FIG. 4). In one example, the increase may be expressed as:

$$EP\_avail\_thres(k) = \min(DD\_power + offset, SD\_disc\_lim)$$

where EP_avail_thres is the threshold amount of electrical power that is available to the electric machine to propel the vehicle, min is a function that returns a lesser value of argument (DD_power+offset), and argument SD_disc_lim, k is the iteration value, and offset is a predetermined scalar value that ensures that DD_power is less than EP_avail_thres until DD_power is greater than SD_disc_lim.

The min function ensures that the threshold amount of electrical power that is available to power the electric machine that may provide propulsive force to the driveline is less than or equal to the upper electric energy storage device discharge power upper threshold amount. Method 1000 proceeds to 1010.

At 1010, method 1000 adjusts an amount of electrical power that is available to high voltage (HV) electrical accessories. In particular, when the desired driver demand power is increasing, then a threshold amount of electrical power available to an electric machine is decreased according to the following equation:

$$HV\_acc\_power = SD\_disc\_lim - EP\_avail\_thres$$

where HV_acc_power is an amount of electrical power provided to high voltage accessories, though the high voltage accessories need not consume this amount of power.

Additionally, in some examples, method 1000 may compensate the amount of electrical power provided to high voltage accessories based on catalyst efficiency. The compensated amount of electrical power provided to high voltage accessories based on catalyst efficiency may be expressed as:

$$HV\_acc\_power\_comp = min(HV\_acc\_power, (HV\_cat\_fun(cat\_eff)))$$

where HV_acc_power_comp is the catalyst compensated value of the amount of electrical power provided to high voltage accessories, min is a function that returns the lesser value of the arguments HV_acc_power and HV_cat_fun (cat_eff), HV_cat_fun is a function that returns an amount of electrical power that may be provided to high voltage accessories based on catalyst temperature (e.g., the function shown in FIG. 5), and cat_eff is an estimate of catalyst efficiency. Catalyst efficiency may be estimated according to a function similar to the function illustrated in FIG. 11. Method 1000 proceeds to 1012.

At 1007, method 1000 may decrease the threshold amount of electrical power that is available to an electric machine (e.g., threshold 452 in FIG. 4). In one example, the decrease may be expressed as:

$$EP\_avail\_thres(k) = max(EP\_avail\_min, (EP\_avail\_thresh(k-1) - offset\_a))$$

where EP_avail_thres(k) is the new threshold amount of electrical power that is available to the electric machine to propel the vehicle, k is the iteration value, max is a function that returns a greater value of argument (EP_avail_thresh (k−1)−offset_a) and argument EP_avail_min, k is the iteration value, offset_a is a predetermined scalar value that ensures a predetermined rate of value reduction, and EP_avail_min is a minimum amount of power available to the electric machine that may provide propulsive force to the vehicle driveline. The value of EP_avail_min may be determined via subtracting a maximum amount of electrical power that may be delivered to accessories electrically coupled to a high voltage bus from the value of SD_disc_lim.

At 1009, method 1000 adjusts an amount of electrical power that is available to high voltage (HV) electrical accessories. In particular, when the desired driver demand power is decreasing, then a threshold amount of electrical power available to an electric machine is increased according to the following equation:

$$HV\_acc\_power(k) = SD\_disc\_lim - EP\_avail\_thres(k)$$

where HV_acc_power(k) is an amount of electrical power provided to high voltage accessories, though the high voltage accessories need not consume this amount of power.

Additionally, in some examples, method 1000 may compensate the amount of electrical power provided to high voltage accessories based on catalyst efficiency. The compensated amount of electrical power provided to high voltage accessories based on catalyst efficiency may be expressed as:

$$HV\_acc\_power\_comp(k) = min(HV\_acc\_power(k), (HV\_cat\_fun(cat\_eff)))$$

where HV_acc_power_comp(k) is the catalyst compensated value of the amount of electrical power provided to high voltage accessories, min is a function that returns the lesser value of the arguments HV_acc_power and HV_cat_fun (cat_eff), HV_cat_fun is a function that returns an amount of electrical power that may be provided to high voltage accessories based on catalyst temperature (e.g., the function shown in FIG. 5), and cat_eff is an estimate of catalyst efficiency. Catalyst efficiency may be estimated according to a function similar to the function illustrated in FIG. 11. Method 1000 proceeds to 1012.

At 1012, method 1000 determines engine power and electric machine power to meet driver demand power. In one example, method 1000 determines electric machine power via a lookup table or function that is referenced via driver demand power, electric energy storage device state of charge, and electric energy storage device temperature. The lookup table or function outputs a desired electric machine power Delec_power. Values in the lookup table may be empirically determined via operating the electric machine and electric energy storage device using a dynamometer and mapping results of electric machine power versus driveline efficiency. The desired engine power may be determined via the following equation:

$$Deng\_power = DD\_power - Delec\_power$$

where Deng_power is the desired engine power, DD_power is driver demand power, and Delec_power is the desired electric machine power. Method 1000 proceeds to 1014.

At 1014, method 1000 commands the engine to the power of the value of variable Deng_power. Method 1000 also commands the electric machine to the power value of variable Delec_power. However, the value of Delec_power is constrained to be less than or equal to the value of EP_avail_thres(k) so that output of the electric energy storage device does not exceed SD_disc_lim. In addition, method 1000 constrains an amount of electrical power provided to high voltage accessories to be less than the value of HV_acc_power_comp(k). In some examples, the value of HV_acc_power_comp(k) may be the lesser of a predetermined value and an amount of electrical power desired by high voltage accessories (e.g., an amount of electrical power for the high voltage accessories to perform at a desired level).

At 1020, method 1000 judges if driver demand power is greater than an upper electric energy storage device discharge power upper threshold amount (e.g., 950 of FIG. 9). The value of the upper electric energy storage device discharge power upper threshold amount may be empirically determined and stored in controller memory. In one example, the upper electric energy storage device discharge power upper threshold amount may be determined via monitoring electric energy storage device temperature and electric energy storage device power output. If method 1000 judges that driver demand power is greater than an upper electric energy storage device discharge power upper threshold amount, then the answer is yes and method 1000 proceeds to 1050. Otherwise, the answer is no and method 1000 proceeds to 1020.

At 1050, method 1000 starts the engine and begins to transfer power from the engine to the driveline. The amount of power that is transferred from the engine to the driveline may be based on the driver demand power, electric energy storage device state of charge, electric energy storage device temperature, and other vehicle conditions. The engine run (e.g., combust fuel) after being started for a predetermined amount of time so that the engine and the catalyst warm up before they are shutdown so that engine emissions and efficiency may be improved. Method 1000 proceeds to 1052.

At 1052, method 1000 decrements the value in an electric power consumer load shed timer that accumulates an amount of time that electric power supplied to high voltage accessories coupled to a high voltage bus has been reduced since a most recent time power supplied to high voltage accessories coupled to the high voltage bus has been reduced. The value in the electric power consumer load shed timer may be decremented until it reaches a minimum value of zero. Method 1000 proceeds to 1054.

At 1054, method 1000 delivers the driver demand power to the driveline via the electric machine and the engine. In one example, method 1000 determines electric machine power via a lookup table or function that is referenced via driver demand power, electric energy storage device state of charge, and electric energy storage device temperature. The lookup table or function outputs a desired electric machine power Delec_power. Values in the lookup table may be empirically determined via operating the electric machine and electric energy storage device using a dynamometer and mapping results of electric machine power versus driveline efficiency. The desired engine power may be determined via the following equation:

$$\text{Deng\_power} = \text{DD\_power} - \text{Delec\_power}$$

where Deng_power is the desired engine power, DD_power is driver demand power, and Delec_power is the desired electric machine power. Method 1000 commands the engine to the power of the value of variable Deng_power. Method 1000 also commands the electric machine to the power value of variable Delec_power. However, the value of Delec_power is constrained to be less than or equal to the value of EP_avail_thres(k) so that output of the electric energy storage device does not exceed SD_disc_lim. In addition, method 1000 constrains an amount of electrical power provided to high voltage accessories to be less than the value of HV_acc_power_comp(k). In some examples, the value of HV_acc_power_comp(k) may be the lesser of a predetermined value and an amount of electrical power desired by high voltage accessories (e.g., an amount of electrical power for the high voltage accessories to perform at a desired level). Method 1000 proceeds to exit.

At 1022, method 1000 judges if high voltage accessory load shedding is desired and if the value of the electric power consumer load shed timer is less than a threshold value (e.g., 20 seconds). In one example, method 1000 may judge that high voltage accessory load shedding is desired when a driver demand power is greater than electric energy storage device discharge power upper threshold amount minus an amount of power being supplied to high voltage accessories or accessories that are coupled to a high voltage bus. These conditions may be expressed as:

$$\text{DD\_power} > \text{SD\_disc\_lim} - \text{HV\_acc}$$

where DD_power is driver demand power, SD_disc_lim is an electric energy storage device discharge power upper threshold amount of power (e.g., 750 of FIG. 7), and HV_acc is an amount of electrical power that is supplied to accessories that are electrically coupled to a high voltage bus (e.g., conductors that transfer charge from a high voltage power source). If method 1000 judges that driver demand power is greater than an electric energy storage device discharge power upper threshold amount minus an amount of power being supplied to high voltage accessories or accessories that are coupled to a high voltage bus, then the answer is yes and method 1000 proceeds to 1024. Otherwise, the answer is no and method 1000 proceeds to 1040.

At 1024, method 1000 increments the value of the electric power consumer load shed timer that accumulates an amount of time that electric power supplied to high voltage accessories coupled to a high voltage bus has been reduced since a most recent time power supplied to high voltage accessories coupled to the high voltage bus has been reduced. Method 1000 proceeds to 1026.

At 1026, method 1000 increases the threshold amount of electrical power that is available to an electric machine (e.g., threshold 752 in FIG. 7). In one example, the increase may be expressed as:

$$\text{EP\_avail\_thres}(k) = \min(\text{DD\_power} + \text{offset}, \text{SD\_disc\_lim})$$

where EP_avail_thres is the threshold amount of electrical power that is available to the electric machine to propel the vehicle, min is a function that returns a lesser value of argument (DD_power+offset), and argument SD_disc_lim, k is the iteration value, and offset is a predetermined scalar value that ensures that DD_power is less than EP_avail_thres until DD_power is greater than SD_disc_lim. The min function ensures that the threshold amount of electrical power that is available to power the electric machine that may provide propulsive force to the driveline is less than or equal to the upper electric energy storage device discharge power upper threshold amount. Method 1000 proceeds to 1028.

At 1028, method 1000 adjusts an amount of electrical power that is available to high voltage (HV) electrical accessories. Specifically, when the desired driver demand power is increasing, then a threshold amount of electrical power available to an electric machine is decreased according to the following equation:

$$\text{HV\_acc\_power} = \text{SD\_disc\_lim} - \text{EP\_avail\_thres}$$

where HV_acc_power is an amount of electrical power provided to high voltage accessories, though the high voltage accessories need not consume this amount of power. Method 1000 proceeds to 1044.

At 1040, method 400 judges if judges if high voltage accessory load shedding is desired and if the value of the electric power consumer load shed timer is greater than a threshold value (e.g., 20 seconds). In one example, method 1000 may judge that high voltage accessory load shedding is desired when a driver demand power is greater than electric energy storage device discharge power upper threshold amount minus an amount of power being supplied to high voltage accessories or accessories that are coupled to a high voltage bus. These conditions may be expressed as:

$$\text{DD\_power} > \text{SD\_disc\_lim} - \text{HV\_acc}$$

where DD_power is driver demand power, SD_disc_lim is an electric energy storage device discharge power upper threshold amount of power (e.g., 750 of FIG. 7), and HV_acc is an amount of electrical power that is supplied to accessories that are electrically coupled to a high voltage bus (e.g., conductors that transfer charge from a high voltage power source). If method 1000 judges that driver demand power is greater than an electric energy storage device discharge power upper threshold amount minus an amount of power being supplied to high voltage accessories or accessories that are coupled to a high voltage bus, then the answer is yes and method 1000 proceeds to 1050. Otherwise, the answer is no and method 1000 proceeds to 1042.

At 1042, method 1000 decrements the value in an electric power consumer load shed timer that accumulates an amount of time that electric power supplied to high voltage accessories coupled to a high voltage bus has been reduced since a most recent time power supplied to high voltage accessories coupled to the high voltage bus has been reduced. The value in the electric power consumer load shed timer may be decremented until it reaches a minimum value of zero. Method 1000 proceeds to 1044.

At 1044, method 1000 method 1000 delivers the driver demand power to the driveline via only the electric machine. In one example, method 1000 determines electric machine power via a lookup table or function that is referenced via driver demand power, electric energy storage device state of charge, and electric energy storage device temperature. The lookup table or function outputs a desired electric machine power Delec_power. Values in the lookup table may be empirically determined via operating the electric machine and electric energy storage device using a dynamometer and mapping results of electric machine power versus driveline efficiency. Method 1000 also commands the electric machine to the power value of variable Delec_power. However, the value of Delec_power is constrained to be less than or equal to the value of EP_avail_thres(k) so that output of the electric energy storage device does not exceed SD_disc_lim. In addition, method 1000 constrains an amount of electrical power provided to high voltage accessories to be less than the value of HV_acc_power_comp(k). In some examples, the value of HV_acc_power_comp(k) may be the lesser of a predetermined value and an amount of electrical power desired by high voltage accessories (e.g., an amount of electrical power for the high voltage accessories to perform at a desired level). Method 1000 proceeds to exit.

In this way, amounts of power supplied to the electric machine that supplies power to the driveline and the engine power may be controlled. Further, the engine may be started during conditions when the electric machine lacks capacity to provide the desired driver demand power.

The method of FIGS. 10A and 10B provides for a vehicle driveline operating method, comprising: via a controller, decreasing an amount of power supplied to high voltage accessories coupled to a high voltage bus responsive to a desired engine power amount plus an electric energy storage device discharge power upper threshold amount minus an amount of power supplied to the high voltage accessories coupled to high voltage bus being greater than a driver demand power. The method further comprises increasing a threshold amount of electrical power available to an electric machine from a high voltage electric energy storage device proportionate to the decrease in the amount of power supplied to high voltage accessories coupled to the high voltage bus. The method includes where the decrease in the amount of power supplied to the high voltage accessories is adjusted responsive to efficiency of a catalyst in an exhaust system of an engine. The method includes where the high voltage accessories include an electrically operated climate control system. The method includes where the electrically operated climate control system is a heat pump. The method includes where the high voltage accessories include a DC/DC converter. The method includes where the high voltage accessories include positive temperature coefficient heating elements for a climate control system.

The method of FIGS. 10A and 10B provides for an engine operating method, comprising: via a controller, decreasing an amount of power supplied to an electric machine that provides propulsive torque to a vehicle driveline and increasing an amount of power supplied to high voltage accessories coupled to a high voltage bus responsive to efficiency of a catalyst in an engine exhaust system increasing. The method includes where the decreasing and the increasing are performed when a desired engine power amount plus an electric energy storage device discharge power upper threshold amount minus an amount of power supplied to the high voltage accessories coupled to high voltage bus is greater than a driver demand power. The method further comprises increasing power output of an engine responsive to the driver demand power exceeding the electric energy storage device discharge power upper threshold amount. The method further comprises decreasing the amount of power supplied to high voltage accessories coupled to the high voltage bus responsive to a driver demand power exceeding an electric energy storage device discharge power upper threshold amount and a value of a timer being less than a threshold. The method includes where the timer is an electric power consumer load shed timer that accumulates an amount of time that electric power supplied to high voltage accessories coupled to a high voltage bus has been reduced since a most recent time power supplied to high voltage accessories coupled to the high voltage bus has been reduced responsive to an electric energy storage device discharge power upper threshold amount minus an amount of power supplied to the high voltage accessories coupled to high voltage bus being greater than a driver demand power. The method includes where the catalyst efficiency is based on a catalyst temperature. The method further comprises adjusting a threshold amount of electrical power available to the electric machine from a high voltage electric energy storage device proportionate to a decrease in an amount of power supplied to the high voltage accessories coupled to the high voltage bus.

Referring now to FIG. 11, an example function that may be the basis for estimating catalyst efficiency is shown. The vertical axis represents catalyst efficiency when an engine is combusting a stoichiometric air-fuel ratio that is oscillating about stoichiometry (e.g., within 10% of stoichiometry). Catalyst efficiency increases in the direction of the vertical axis arrow. The horizontal axis represents catalyst temperature and catalyst temperature increases in the direction of the horizontal axis arrow. Trace 1102 represents the relationship between catalyst temperature and catalyst efficiency.

It may be observed that when catalyst temperature is low, the catalyst efficiency is low. As the catalyst temperature increases, the catalyst efficiency increases. The catalyst efficiency may be estimated via indexing or referencing function 1100 via catalyst temperature. The function outputs an estimate of catalyst efficiency that may be the basis for controlling electric machine output power.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle driveline operating method, comprising:
via a controller, responsive to a desired engine power amount plus an electric energy storage device discharge power upper threshold amount minus an amount of electrical power supplied to accessories being greater than a driver demand power, decreasing the amount of electrical power supplied to the accessories.

2. The method of claim 1, further comprising increasing a threshold amount of electrical power available to an electric machine to propel a vehicle from an electric energy storage device proportionate to the decrease in the amount of power supplied to accessories.

3. The method of claim 1, where the decrease in the amount of power supplied to the accessories is a function of a catalyst efficiency, the function expressed as a relationship between the catalyst efficiency and the amount of power supplied to the accessories.

4. The method of claim 1, where the accessories include an electrically operated climate control system.

5. The method of claim 4, where the electrically operated climate control system is a heat pump.

6. The method of claim 1, where the accessories include a DC/DC converter.

7. The method of claim 1, where the accessories include positive temperature coefficient heating elements for a climate control system.

8. An engine operating method, comprising:
via a controller, decreasing a threshold amount of power available to an electric machine that provides propulsive torque to a vehicle driveline and increasing an amount of power supplied to accessories coupled to a bus that distributes a voltage that is greater than 30 volts as a function of a catalyst efficiency, the function expressed as a relationship between the catalyst efficiency and an amount of power supplied to the accessories, where the decreasing is performed when a desired engine power amount plus an electric energy storage device discharge power upper threshold amount minus an amount of power supplied to the accessories is not greater than a driver demand power.

9. The method of claim 8, where the threshold amount of power available to an electric machine is a maximum of a minimum amount of power available to the electric machine and a prior value of the threshold amount of power available to the electric machine, and further comprising:
increasing power output of an engine responsive to the driver demand power exceeding the electric energy storage device discharge power upper threshold amount.

10. The method of claim 8, further comprising decreasing the amount of power supplied to accessories coupled to the bus responsive to a driver demand power exceeding an electric energy storage device discharge power upper threshold amount and a value of a timer being less than a threshold.

11. The method of claim 10, where the timer is an electric power consumer load shed timer that accumulates an amount of time that electric power supplied to accessories coupled to a bus has been reduced since a most recent time power supplied to accessories coupled to the bus has been reduced responsive to an electric energy storage device discharge power upper threshold amount minus an amount of power supplied to the accessories coupled to bus being greater than a driver demand power.

12. The method of claim 8, where the efficiency of the catalyst is based on a catalyst temperature, and where the accessories include a climate control system and positive temperature coefficient heaters.

13. The method of claim 8, further comprising adjusting a threshold amount of electrical power available to the electric machine from a electric energy storage device proportionate to a decrease in an amount of power supplied to the accessories coupled to the bus.

14. A system, comprising:
vehicle driveline including an engine and an electric machine that provide propulsive force to vehicle wheels;
a bus that transfers a voltage that is greater than 30 volts coupled to a plurality of electrical power consumers; and
a controller including executable instructions stored in non-transitory memory to:
responsive to a driver demand power being greater than an electric energy storage device discharge power upper threshold amount minus an amount of electrical power supplied to the plurality of electrical power consumers, decreasing the amount of electrical power supplied to at least one of the plurality of electric power consumers.

15. The system of claim 14, further comprising additional instructions to decrease an amount of power supplied to the plurality of electrical power consumers responsive to a desired engine power amount plus the electric energy storage device discharge power upper threshold amount minus the amount of power supplied to the plurality of electrical power consumers being greater than the driver demand power.

16. The system of claim 14, further comprising additional instructions to increase a threshold amount of electrical power available to the electric machine from an electric energy storage device proportionate to the decrease in the amount of power supplied to the plurality of accessories.

17. The system of claim 14, further comprising additional instructions to start the engine responsive to the driver demand power exceeding the electric energy storage device discharge power upper threshold amount.

18. The system of claim 14, further comprising additional instructions to record an amount of time since a most recent time the amount of power supplied to at least one of the plurality of electrical power consumers has been reduced.

19. The system of claim 18, further comprising additional instructions to decrease the amount of time in response to the driver demand power being less than the electric energy storage device discharge power upper threshold amount minus an amount of power supplied to the plurality of electrical power consumers.

* * * * *